Patented Nov. 10, 1925.

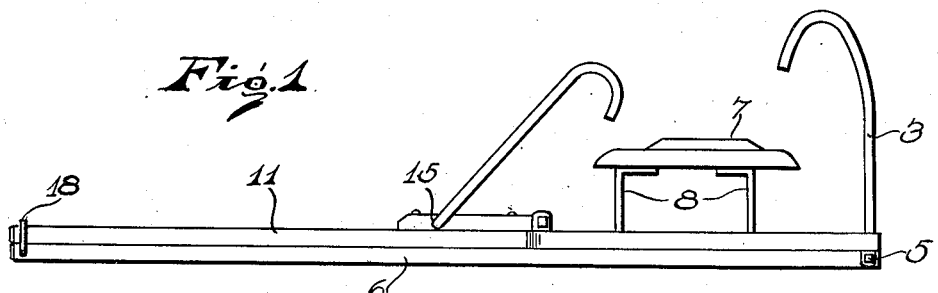
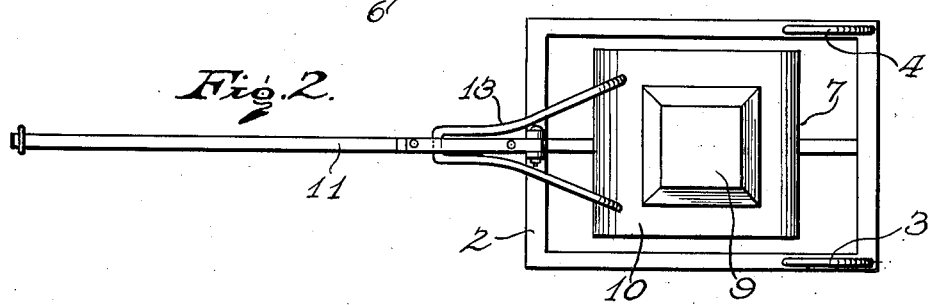
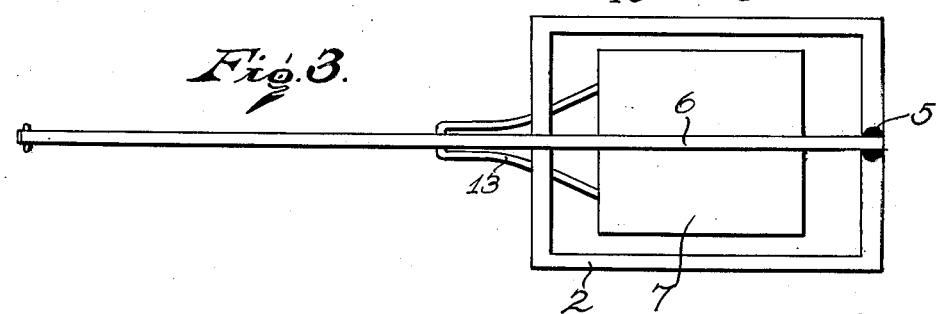
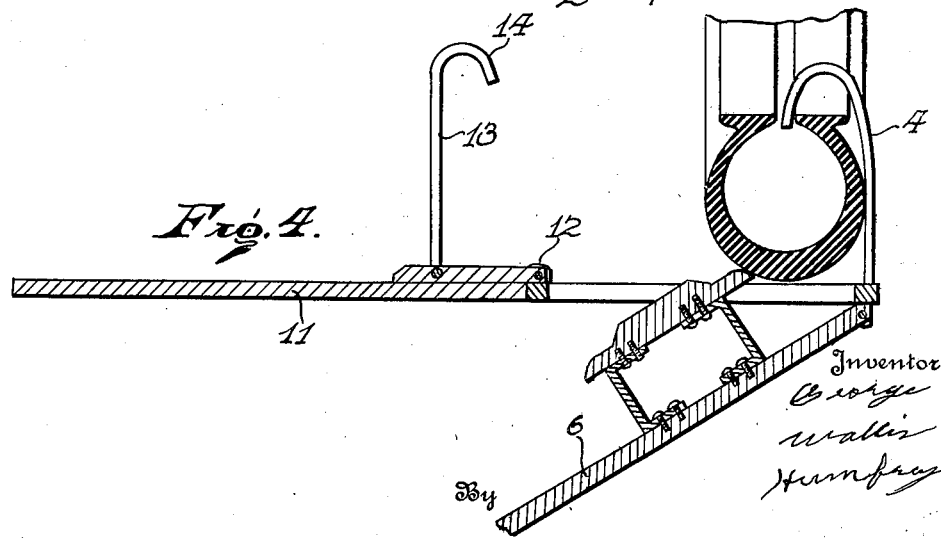

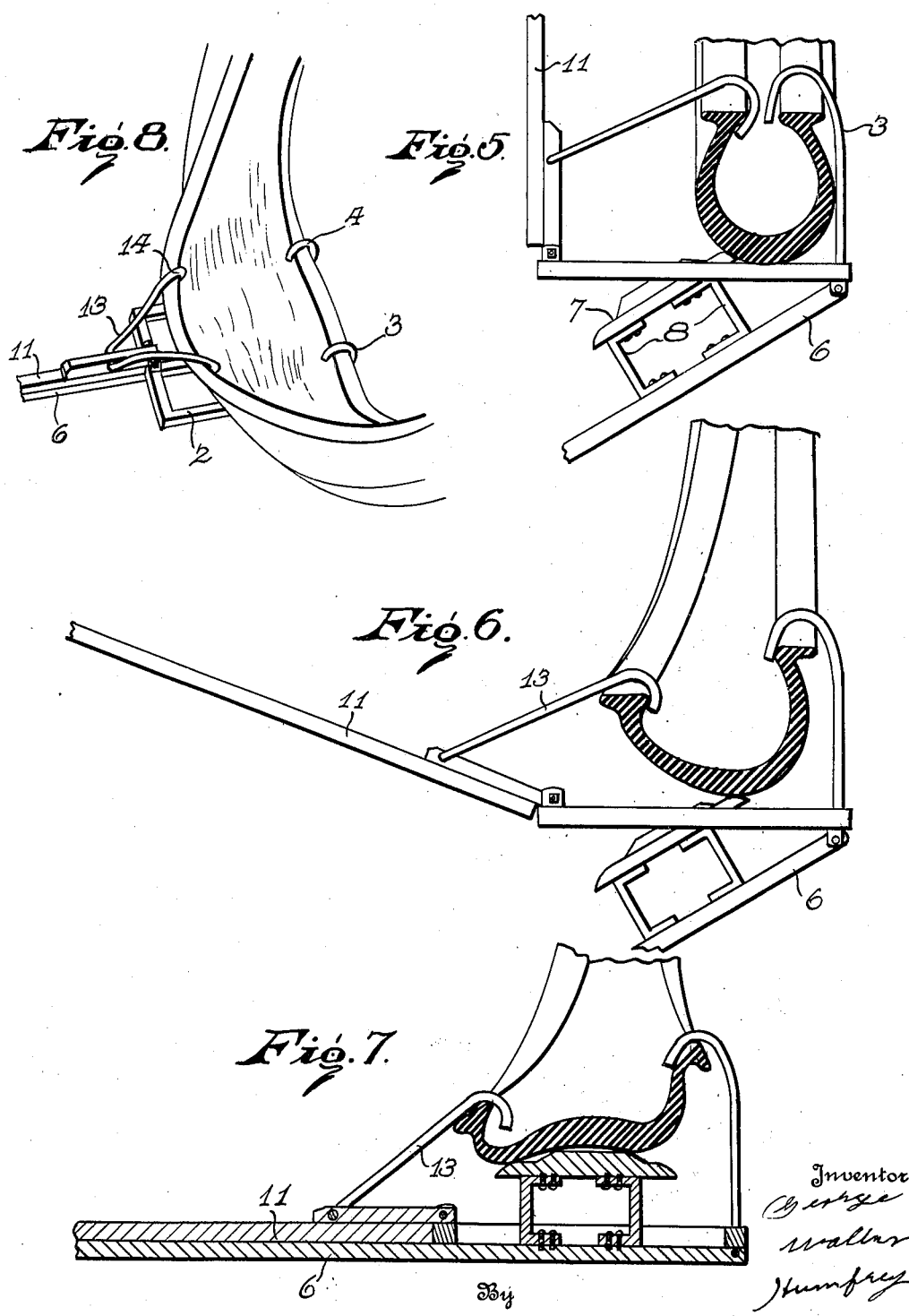

1,561,079

UNITED STATES PATENT OFFICE.

GEORGE WALLIS HUMFREY, OF FLINT, MICHIGAN.

TIRE SPREADER.

Application filed November 3, 1924. Serial No. 747,570.

*To all whom it may concern:*

Be it known that GEORGE WALLIS HUMFREY, a citizen of the Dominion of Canada, residing at Flint, in the county of Genesee and State of Michigan, has invented certain new and useful Improvements in Tire Spreaders, of which the following is a specification.

This invention relates to tire spreaders.

An object of this invention is to provide a tire spreader which is quickly installed, and which quickly and readily spreads the tire, and which at the same time automatically provides the desired configuration of the surface of the tire for working thereon.

A further object of this invention is to provide a device of this character which is of simple construction, which may be simply and inexpensively manufactured, and which at the same time operates in an improved manner.

With the foregoing and other objects in view I have invented the device as illustrated in the accompanying drawings, in which:

Figure 1 is a side elevation of my improved device.

Figure 2 is a top plan view thereof.

Figure 3 is a bottom plan view.

Figure 4 is a vertical section showing the first step in operating the device.

Figure 5 is a like elevation showing the second step in operating the device.

Figure 6 is a like elevation showing the third step in operating the device.

Figure 7 is a like section showing the last step in operating the device.

Figure 8 is a perspective showing of the device in the position shown in Figure 7.

Like reference characters indicate like parts throughout the several views of the drawings and in the specification, in which 2 is a rectangular frame carrying affixed thereto hooks 3 and 4, which hooks 3 and 4 are adapted to hook over one side of the tire, the rectangular frame being preferably made of bar iron substantially ¾" square. Pivoted to the frame 2 at 5 is a lever 6 of the same material as the frame, which lever 6 carries a block 7, which block 7 is of the same configuration as the frame 2 but of slightly less dimensions, thereby allowing it to move freely into and out of the frame 2 upon the movement of the lever 6 upon its axis 5. The block 7 is carried by brackets 8, and comprises two elements, an upper or pyramidal shaped element 9, and a lower and larger pyramidal shaped element 10. Pivotally mounted to the opposite side of the frame from that of the pivotal mounting of the lever 6, is a lever 11, which is pivoted to the frame at 12. and carries a V-shaped pair of arms 13 terminating in hooks 14, which hooks 14 are adapted to engage the opposite side of the tire to that of the hooks 3, the arms 13 being unitary and pivoted at 15 to the lever 11. In operation, the hooks 3 and 4 are dropped over one side of the tire as shown in Figure 4, whereupon the device assumes substantially the position shown in Figure 5 in which the lever 6 gravitates. The lever 11 is then bent forward preferably with the hand embracing the arm 13, which causes the hooks 14 to engage the other side of the tire, then by taking the lever 11 in one hand and the lever 6 in the other hand and drawing them together, it is obvious that the tire will be spread apart, and that the block 7 will force the tire in the position shown in Figure 8. When thus together the tire then may be locked from movement by swinging an eyelet such as 18 carried by one of the members over the other member, in which position the tire is held so it may be scraped and worked upon as desired.

Claims:

1. A device of the character described including a member adapted to embrace one side of the tire, a member adapted to embrace another side of the tire, a supporting member for the tire embracing members, the tire embracing members pivotally mounted to the supporting member, and a base member adapted to press against the tire and carried by the supporting member.

2. A device of the character described including a frame, tire grasping hooks mounted to the frame, a member adapted to press against the tire pivotally mounted to the frame, and means for cooperatively pulling upon the hooks and causing the pressing member to engage the tire.

3. A device of the character described including a frame, a member pivotally mounted to the frame and carrying a block, hooks mounted to the frame, and levers cooperating with the frame and the block and the hooks for simultaneously pushing the block against the tire and separating the hooks.

4. A device of the character described including a rectangular frame, a member pivotally mounted to the frame and carrying a block adapted to pass through the frame, the pivotally mounted member extending into a lever, a second lever, one member pivotally mounted to the frame and hook members carried by the second lever, the members arranged so that upon moving the levers together, the block will press against a tire and the hook members will spread the tire.

5. A device of the character described including a frame member, a block, the block adapted to pass through the frame member and pivotally mounted to the frame member, a lever, a hook pivotally mounted to the frame member and a hook pivotally mounted to the lever.

6. A device of the character described including a rectangular frame, a lever pivoted to one side of the frame and provided with a block, means including bracket elements for spacing the lever and block, a second lever pivotally mounted to the frame, hooks mounted to the frame and second lever, the members arranged whereby upon bringing the members together, the block will push against the tire and the hooks will separate the tire.

7. In combination, a lever, a frame pivotally mounted on the lever, a block carried by the lever movable through the frame, hooks carried by the frame for engaging one side of the tire, and a second lever pivotally mounted on the frame and provided with hooks for engaging another side of the tire, the hooks adapted to spread the tire upon the the levers being drawn together.

8. In combination, a rectangular frame, a rectangular block movable through the frame, a lever carrying the block and pivotally mounted on the frame, hooks mounted on the edge of the frame, a second lever pivotally mounted on the opposite side of the frame from the first lever, and a hook member pivotally carried by the second lever member, the lever members adapted to be drawn together to force the block against the tire, and to draw the hooks apart for spreading the tire.

In testimony whereof I affix my signature.

GEORGE WALLIS HUMFREY.